Figure 1:
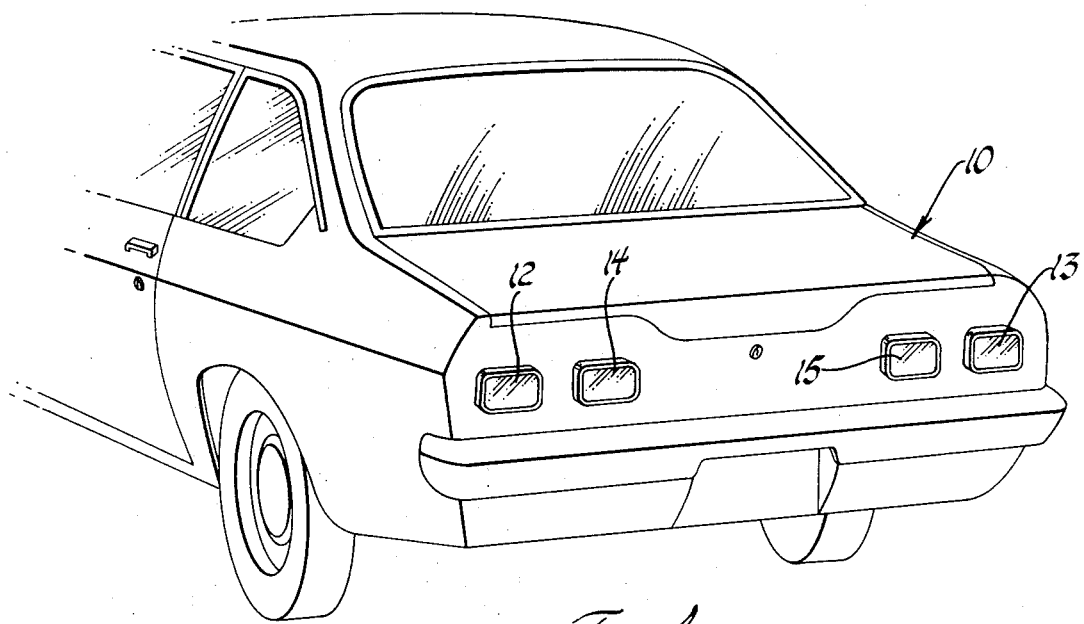

United States Patent
Bauchan

[15] 3,702,459
[45] Nov. 7, 1972

[54] VEHICLE DECELERATION CIRCUIT
[72] Inventor: Michael L. Bauchan, Troy, Mich.
[73] Assignee: General Motors Corporation, Detroit, Mich.
[22] Filed: June 3, 1971
[21] Appl. No.: 149,708

[52] U.S. Cl. .................... 340/62, 340/66, 340/71
[51] Int. Cl. ........................................... B60q 1/44
[58] Field of Search ................. 340/52, 66, 67, 71, 72

[56] References Cited

UNITED STATES PATENTS

| 2,685,048 | 7/1954 | Schweitzer | 340/71 UX |
| 3,431,556 | 3/1969 | Johnson | 340/66 X |
| 3,483,509 | 12/1969 | DeCoye DeCastelet | 340/81 R |
| 3,559,165 | 1/1971 | Kleemann | 340/75 |

OTHER PUBLICATIONS

German printed application 1,904,246, Priets, published 8/1970, 340- 369.

Primary Examiner—Kenneth N. Leimer
Attorney—J. L. Carpenter and Paul Fitzpatrick

[57] ABSTRACT

Apparatus for indicating deceleration and braking of a vehicle. The apparatus includes first and second groups of brake lamps each of which includes a first lamp on the left side of the vehicle and a second lamp on the right side of the vehicle. On application of the vehicle brakes all four of the brake lamps are energized to advise following motorists that the vehicle is being braked. When the vehicle is being decelerated at greater than a certain rate of deceleration while travelling faster than a certain speed only the second group of brake lamps is energized to indicate deceleration of the vehicle to following motorists.

1 Claim, 2 Drawing Figures

PATENTED NOV 7 1972

3,702,459

INVENTOR.
Michael L. Bauchan
BY
Paul Fitzpatrick
ATTORNEY

VEHICLE DECELERATION CIRCUIT

This invention relates to vehicle signalling systems and, more particularly, to lighting systems for advising motorists following a vehicle that the vehicle is being braked or decelerated.

During the course of operating a motor vehicle a motorist must be constantly aware of the manner in which other motorists are operating their vehicles. In the case of a motorist following another motor vehicle on a highway, the following motorist must be careful to maintain a safe stopping distance between his vehicle and the vehicle he is following. It has therefore been the general practice to equip all motor vehicles with brake lamps that are visible to following motorists and are automatically energized whenever the vehicle on which they are mounted is being braked.

While the information thus conveyed by these brake lamps is of considerable importance to the following motorists, there are certain circumstances in which following motorists may benefit from additional information regarding the operation of a motor vehicle they are following. For example, if a motorist releases his vehicle's accelerator and performs the well known maneuver of "down shifting" to slow the speed of his vehicle he may rapidly decelerate his vehicle without causing energization of his brake lamps. Motorists following vehicles which are decelerated in this manner must therefore be extremely alert to maintain a safe stopping distance between their vehicle and the vehicle ahead. This problem becomes especially acute during nighttime hours as darkness decreases the depth perception of motorists and thus increases the likelihood of rear end collisions caused by following another motorist too closely.

Accordingly, various systems have been proposed to indicate to following motorists that a vehicle is being decelerated at an unusually rapid rate. For example, it has been suggested that apparatus responsive to a vehicle brake system could be employed to indicate normal braking of the vehicle by energization of certain vehicle brake lamps and abnormally hard braking of the vehicle by energization of additional brake lamps to give an increased warning to following motorists, though such a system would not indicate deceleration by down shifting. It has also been suggested that apparatus for indicating deceleration of a vehicle regardless of whether the vehicle brakes are applied could be provided by employing several lamps in addition to the vehicle brake lamps, the brake lamps being energized in response to brake application and the additional lamps being energized in response to another condition.

While the additional information provided by these prior systems may in certain circumstances prove of value, the disadvantages of these systems have prevented their gaining widespread acceptance. For example, it is believed that the systems which are operable in response to vehicle deceleration have not gained acceptance because the complexity of the signals they employ to indicate deceleration tends to confuse motorists unfamiliar with such systems. The systems employing less complex signals on the other hand, tend to be of limited value as application of the vehicle brakes is generally required to indicate vehicle deceleration.

Accordingly, it is an object of the present invention to provide apparatus for energizing a certain number of brake lamps when braking a vehicle and for energizing a lesser number of the brake lamps when the vehicle is being decelerated faster than a certain rate without application of the vehicle brakes.

It is an additional object of this invention to provide apparatus for energizing a certain number of vehicle brake lamps when the vehicle is being braked and for energizing a smaller number of brake lamps when the vehicle is being decelerated faster than a certain rate of deceleration while the vehicle is travelling faster than a certain speed.

Figure 2:
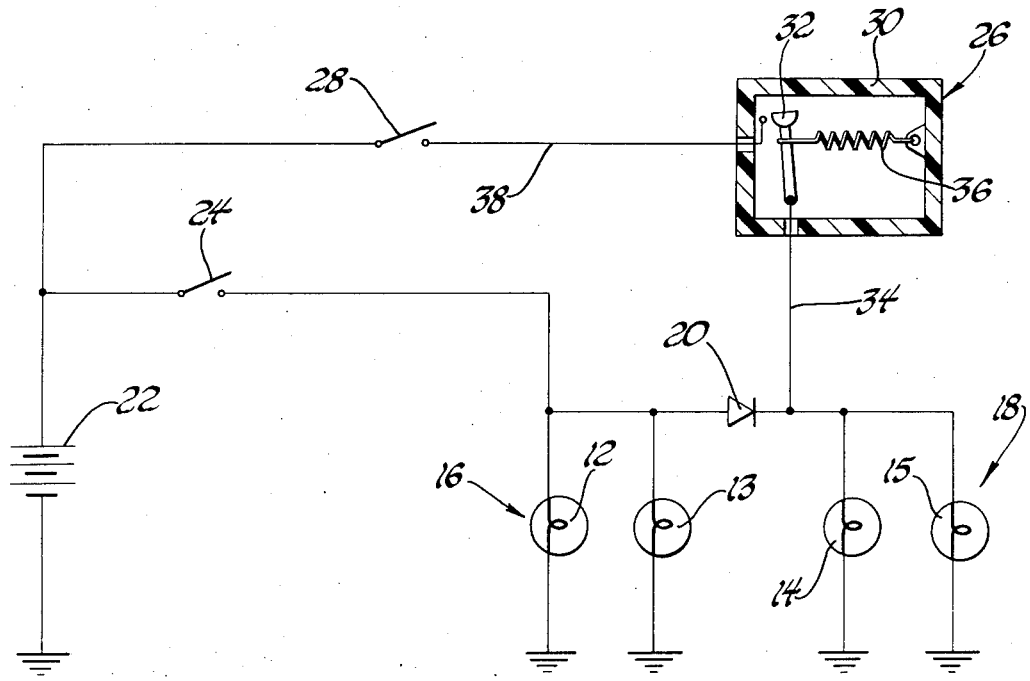

The foregoing and other objects and advantages of the subject invention will become apparent from the accompanying description and drawings, in which:

FIG. 1 is a rear view of a vehicle having brake lamps operable in accordance with the present invention; and FIG. 2 is a schematic diagram of a preferred embodiment of the present invention. As shown in FIG. 1, it is contemplated that a vehicle 10 equipped with apparatus according to the present invention have an array of brake lamps 12 through 15, secured to the rear of the vehicle 10 in a manner similar to that in FIG. 1. In the illustrated and preferred embodiment the lamps 12 and 14 are on the left side of the vehicle 10 and the lamps 13 and 15 are on the right side of the vehicle 10. Though the illustrated arrangement of the lamps 12 through 15 is not essential to this invention the purpose of this arrangement will subsequently be described in detail.

As shown in FIG. 2, the lamps 12 and 13 form a first lamp group 16 and the lamps 14 and 15 form a second lamp group 18. The lamps within each of the groups 16 and 18 are connected in parallel and the lamp groups 16 and 18 are connected by a diode 20 connected with the illustrated polarity. A power source, such as a vehicle battery 22, is provided for energizing the lamps 12 through 15 in accordance with the setting of a brake switch 24. The brake switch 24 is not crucial to the present invention and may be of any well known design presently employed in motor vehicles and characterized as being normally open during operation of the vehicle 10 and closed when the brakes (not shown) of the vehicle 10 are applied.

Energization of the brake lamps 14 and 15 is also controlled in accordance with the settings of a deceleration switch 26 and a speed switch 28, which are connected in a series circuit with the battery 22 and the second lamp group 18.

The deceleration switch 26 is designed so as to be open when the deceleration of the vehicle is below a certain deceleration rate and to be closed when the vehicle deceleration exceeds the certain rate. While its design is not important for purposes of this invention, it is shown in the illustrated embodiment as including a housing 30 that is made of an insulating material such as plastic and a conductive pendulum 32. The pendulum 32 is pivotally attached to a lead 34 and biased by a tension spring 36; which is also positioned within the housing 30, as to preclude contact between the pendulum 32 and a lead 38 until the deceleration of the vehicle exceeds the certain rate. The deceleration switch 26 is positioned in the vehicle 10 so that deceleration of the vehicle as it travels in a forward direction moves the pendulum 32 toward the lead 38. At a certain rate of deceleration the biasing force in the spring 36 is overcome and the pendulum 32 contacts the lead 38.

The speed switch 28 design is similarly unimportant to the subject invention as any switch characterized as being open when the vehicle 10 is travelling below a certain speed and closed when the vehicle 10 is travelling faster than the certain speed will serve as the speed switch 28. As persons versed in the art will appreciate, a switch such as the speed switch 28 may be responsive to a speedometer cable of the vehicle 10 or other suitable speed reference. Accordingly, the speed switch 28 is merely schematically illustrated for purposes of the following operation description.

When the vehicle 10 is in operation at a steady speed the brake lamps 12 through 15 will all remain deenergized as none of them are connected in a closed circuit with the battery 22. Should the vehicle 10 be braked the brake switch 24 will be closed so as to complete a series circuit from the battery 22 to the lamps 12 and 13 in the first lamp group 16. In addition, upon closure of the brake switch 24 the potential of the battery 22 is applied through the diode 20 to the lamps 14 and 15 of the second lamp group 18. Since the voltage drop in the forward direction across the diode 20 is relatively small, usually about 0.5 volts, compared with the voltage of the battery 22, which is approximately 12.0 volts in most vehicles, substantially the full voltage of the battery 22 is applied to all of the lamps 12 through 15 upon closure of the brake switch 24. Accordingly, all of the lamps 12 through 15 become energized whenever the vehicle 10 is being braked regardless of the vehicle deceleration rate.

If the speed of the vehicle 10 exceeds the certain speed, the speed switch 28 is closed. The deceleration switch 26 is positioned in the vehicle 10 so that when the rate of deceleration of the vehicle 10 exceeds the certain level, the conductive pendulum 32 engages the lead 38 so as to complete a series circuit from the battery 22 to the second lamp group 18 through the speed switch 28 and the deceleration switch 26. Accordingly, when the vehicle 10 deceleration rate exceeds the certain rate while the vehicle 10 is travelling faster than the certain speed the battery 22 energizes the lamps 14 and 15 through the deceleration and speed switches 26 and 28. However, since the diode 20 is a unidirectional current conducting device it prevents closure of the deceleration and speed switches 26 and 28 from effecting energization of the lamps 12 and 13 in the first lamp group 16.

As is apparent to persons versed in the art, the apparatus just described effects energization of all the brake lamps 12 through 15 whenever the vehicle brakes are applied and only effects energization of the brake lamps 14 and 15 when the vehicle 10 decelerates faster than a certain deceleration rate while travelling in excess of a certain speed. Since the lamps 14 and 15 can be energized when the vehicle 10 speed is below the certain speed only by closure of the brake switch 24, it is also apparent that in slow speed traffic the lamps 12 through 15 will be energized in a manner similar to the brake lamps presently in widespread usage. It is only at vehicle speeds higher than the certain speed that an indication of vehicle deceleration is provided in the absence of vehicle braking. By so limiting the operation of the brake lamps 14 and 15 it is contemplated that motorist confusion as a consequence of unfamiliarity with the signals afforded by the subject apparatus will be minimized.

Should it be desirable to employ the brake lamps 14 and 15 as indicators of the vehicle 10 deceleration at all speeds rather than only above the certain speed, this may be effected by eliminating the speed switch 28 and connecting the lead 38 directly to the battery 22. This and various other modifications of the present invention may be made by persons versed in the art without departing from its spirit.

What is claimed is:

1. Apparatus for indicating deceleration and braking of a vehicle comprising, in combination, first and second lamp groups of parallel connected stop lamps secured to the vehicle for indicating deceleration of the vehicle to following motorists, a power source for energizing the lamps, a brake switch that is responsive to application of the vehicle brakes connecting the power source to the first lamp group so as to effect energization of the lamps in the first lamp group when the vehicle brakes are applied, a deceleration switch that is responsive to deceleration of the vehicle, a speed switch that is responsive to the speed of the vehicle, means connecting the speed and deceleration switches in series between the power source and the second lamp group so as to effect energization of the lamps in the second lamp group when the vehicle speed exceeds a certain speed and the vehicle is decelerating at a rate greater than a predetermined rate, and unidirectional current conducting means connecting the brake switch to the second lamp group so as to effect energization of the lamps in the second lamp group whenever the vehicle brakes are applied while preventing current flow from the speed and deceleration switches to the first lamp group, application of the vehicle brakes thereby effecting energization of the lamps in both lamp groups regardless of the vehicle deceleration rate and speed and deceleration of the vehicle in excess of the predetermined rate while the vehicle is travelling faster than the certain speed thereby effecting energization of the lamps in the second lamp group regardless of whether the vehicle brakes are applied.

* * * * *